(12) United States Patent
Huang et al.

(10) Patent No.: US 7,812,073 B2
(45) Date of Patent: Oct. 12, 2010

(54) PREPARATION METHOD OF SMALL PARTICLE SIZED POLYBUTADIENE LATEX USED FOR THE PRODUCTION OF ABS

(75) Inventors: Liben Huang, Wolitun (CN); Zhiqiang Wan, Wolitun (CN); Yizhang Li, Wolitun (CN); Jian Zhou, Wolitun (CN); Xingcai Jiang, Wolitun (CN); Shufeng Wang, Wolitun (CN); Chengbao Li, Wolitun (CN); Yuliang Lou, Wolitun (CN); Yan Liu, Wolitun (CN)

(73) Assignees: China National Petroleum Corporation, Beijing (CN); China National Petroleum Corporation Daqing Petro-Chemical Complex, Daqing Heilongjiang Province (CN)

( * ) Notice: Subject to any disclaimer, the term of this patent is extended or adjusted under 35 U.S.C. 154(b) by 241 days.

(21) Appl. No.: 11/665,134

(22) PCT Filed: Oct. 9, 2005

(86) PCT No.: PCT/CN2005/001657

§ 371 (c)(1),
(2), (4) Date: Jun. 5, 2008

(87) PCT Pub. No.: WO2006/039860

PCT Pub. Date: Apr. 20, 2006

(65) Prior Publication Data

US 2009/0076205 A1    Mar. 19, 2009

(30) Foreign Application Priority Data

Oct. 12, 2004    (CN) .......................... 2004 1 0080804
Oct. 12, 2004    (CN) .......................... 2004 1 0080805

(51) Int. Cl.
*C08J 3/16*    (2006.01)

(52) U.S. Cl. ..................................... 523/352
(58) Field of Classification Search ................. 523/352
See application file for complete search history.

(56) References Cited

U.S. PATENT DOCUMENTS 7,019,049  B1 *   3/2006  Yoo et al. .................... 523/201

FOREIGN PATENT DOCUMENTS

| CN | 94109547.9 | | 2/1996 |
| EP | 0650983 | | 3/1995 |
| WO | WO 02/00691 | * | 1/2002 |

* cited by examiner

*Primary Examiner*—Edward J Cain
(74) *Attorney, Agent, or Firm*—Dority & Manning, P.A.

(57) ABSTRACT

A preparation method of small particle-sized polybutadiene latex used for the production of ABS is disclosed, which includes putting components comprising 34.00-45.00% by weight of the butadiene, 0-6.0% by weight of the second monomer, 52.11-63.13% by weight of the desalinized water, 0.12-0.22% by weight of the mercaptan(TDM), 0.80-2.60% by weight of the emulsifiers composed of potassium abietate and potassium oleate, into the same polymerization reactor, then heating the mixture of the components and stirring the same at a temperature range of 60-75° C. The reaction lasts for 9-12 hours and the conversion is higher than 97%. The method has the advantages such as higher conversion, shorter reaction period and lower latex viscosity. During the first stage of the reaction, more heat is released by increasing the reaction rate. When the conversion reaches 40-80%, the heat release rate of intermediate stage is depressed by decreasing the reaction temperature. When the conversion is higher than 80%, the reaction temperature reaches the highest. Thus, severe heat release is avoided. Moreover, the butadiene polymerization can be controlled steadily and the reaction period is shortened.

6 Claims, 1 Drawing Sheet

PREPARATION METHOD OF SMALL PARTICLE SIZED POLYBUTADIENE LATEX USED FOR THE PRODUCTION OF ABS

TECHNICAL FIELD OF THE INVENTION

This invention relates to the technical field of engineering plastic ABS resin production, in particular, to a preparation method of small particle-sized polybutadiene latex used for the production of ABS.

BACKGROUND OF THE INVENTION

ABS resin is obtained from copolymerizing butadiene, styrene, and acrylonitrile. It has outstanding physical-mechanical performance and is one of the important resins among engineering polymer materials. In ABS resin production, emulsion batch polymerization is widely adopted. First of all, butadiene is polymerized into polybutadiene (hereinafter referred to as PB) latex. Then, PB latex is graft polymerized with styrene and acrylonitrile to form ABS graft polymer powder, which is eventually blended with SAN (binary copolymer of styrene and acrylonitrile) to produce ABS resin granules. Particle size of PB latex greatly affects the performance of ABS product. It has been proven that the best performance of ABS is when particle size of the PB latex is about 300 nm. There are two ways to produce PB latex of large particle size, namely, butadiene direct polymerization and agglomeration. Butadiene direct polymerization, which has various defects, has been replaced by agglomeration gradually. Agglomeration, which is widely used at present, includes the polymerization of PB latex with small particle sizes of approximate 100 nm. A reagent is then used to agglomerate the small particle sized PB latex. After agglomeration, the mean particle size of PB latex becomes more than 300 nm. Then, the agglomerated latex is graft polymerized with styrene and acrylonitrile to form ABS powder. LG Company, Kumho Tire Inc. and Chi Mei Corporation of Taiwan all adopt the method of agglomeration to produce PB latex with a particle size of 300 nm though their polymerization technologies are different from each other. LG Company uses fatty acid soap and abietic acid soap as emulsifying agent to produce small particle-sized PB latex. The time for polymerization lasts 17 hours, and the monomer conversion is up to 90%. Kumho Tire Inc. uses abietic soap as emulsifying agent, and oleic soap is added in the late phase of the reaction to produce small particle-sized PB latex. The time for reaction lasts 20 hours, and the monomer conversion is more than 97%. A Chinese Application No. 94109547.9, in the name of Chi Mei Corporation of Taiwan, China, discloses that sodium lauryl sulfate is used as emulsifying agent to synthesize small particle sized PB latex. The reaction time is 12 hours, and the monomer conversion is up to 94%. A European patent Application having the publication No. EP0650983 in the name of GE Company of USA discloses that only fatty acid soap is used as emulsifying agent. The total reaction time is 14 hours, including 9 hours for reaction at 63° C. and 5 hours for reaction at 71° C. The monomer conversion reaches 100%, and the conversion in extended test is more than 94%.

In addition, the two methods of butadiene direct polymerization and chemical agglomeration are adopted in polybutadiene (PB) polymerization, achieving particle size of the obtained latex of 300 nm. The purpose of chemical agglomeration is to improve the productivity and shorten the reaction time. As the reaction time for PB polymerization is shortened, the exothermic time of PB polymerization is shortened accordingly. Particularly, when the polymerization time is shortened to within 10 hours, the exothermicity will be very fierce, so it is desired that the reaction heat is released evenly during the ten hours. The characteristics of PB polymerization are to show that when the conversion is less than 40%, the reaction heat is released evenly; when the conversion is in the range of 40%~80%, the reaction heat is released extremely fiercely; when the conversion is more than 80%, the released reaction heat is reduced as monomers are consumed. The present common temperature-controlling curve of PB polymerization in the world indicates a ladder-type ascent curve, and it is necessary to remove heat from the polymerization system, so as to control the temperature. Also, it is required that the system has powerful heat removing conditions to stabilize the temperature. However, it is hard to remove heat from the polymerization reactor, and how to evenly discharge the reaction heat of polymerization is the key to stabilize the fierce heat releasing.

SUMMARY OF THE INVENTION

Objects and advantages of the invention will be set forth in part in the following description, or may be obvious from the description, or may be learned through practice of the invention.

The purpose of the invention is to provide a method for preparation of small particle sized polybutadiene latex used for ABS production comprising the steps of: Preparing the following ingredients using the weight percentages shown below:

| | |
|---|---|
| Butadiene | 34.00~45.00% |
| The second monomer | 0~6.000% |
| desalinized water | 52.11~63.13% |
| Tert-dodecylthiol (TDM) | 0.12~0.22% |
| Emulsifying agent | 0.80~2.60% |
| Electrolyte | 0.12~0.32% |
| $K_2S_2O_2$ | 0.06~0.20% |

Emulsifying agent and the above-mentioned ingredients are added into a polymerization reactor, stirred, and heated for polymerization. The temperature for polymerization is controlled in the range of from 60 to 75° C. The reaction time is 9~12 hours. The emulsifying agent is prepared from mixing potassium oleate and potassium abietate with a mixing ratio of 1:0.2~8.0. The second monomer is selected from the group consisting of styrene, acrylonitrile and Methyl methacrylate.

During polymerization, a part of the emulsifying agent is optionally added together with the other said ingredients into the reactor for stirring and heating. Then remaining part of the emulsifying agent is then added into the reactor for the polymerization.

Preferably 80~90% of the emulsifying agent and the other ingredients are added into the reactor. The reaction temperature is controlled in the range of 65~70° C. When the conversion reaches 60~80%, the remaining 10~20% emulsifying agent is added. The conversion will increase to more than 97%.

In polymerization, preferably the second monomer is styrene, and the second monomer styrene is added in amount of 1.2~3.5%.

In other words, this invention provides a method for preparation of small particle-sized PB latex by employing a mixed soap of potassium oleate and potassium abietate as emulsifying agent, butadiene and styrene as mixed monomer, with a reaction time of 9~12 hours and the monomer conversion of more than 97%.

In a preferred embodiment, 80~90% of the emulsifying agent and above ingredients are added into the reactor at the same time; the reaction temperature is controlled in the range of 65~70° C.; when the conversion reaches 60~80%, the remaining 10~20% emulsifying agent is added; the reaction time is 9~12 hours.

In another embodiment, styrene is added as the second monomer, and such addition will change the visual quality of the final ABS products.

As a further preferable embodiment, styrene is added as the second monomer for the polymerization in the amount of 1.2~3.5%.

In the polymerization, the results are obtained as follows:

Conversion: ≧97%;

Reaction time: 7~10 hours;

Particle size of Latex: 100~120 nm;

Viscosity: ≦150 cps.

The agglomeration effects of using aid latex can be seen that: precipitate is ≦0.1%, agglomeration time is only 0.5 hours, particle size of latex after agglomeration shows ≧300 nm.

From above results, it can be seen that the method for preparation of small particle-sized PB latex of the invention is characterized by short polymerization time, large latex particle size, high monomer conversion, and low latex viscosity. The PB latex of the invention has outstanding agglomeration effects. The method for latex preparation has advantages of outstanding effects, high conversion, short reaction time, and low viscosity.

Another purpose of this invention is to provide a method for preparation of small particle-sized polybutadiene latex for ABS production, wherein the reaction temperature in initial phase is increased; the reaction temperature is reduced to slower the speed of heat releasing when the conversion is in the range of 40%~80%; the reaction temperature is increased to the highest when the conversion is more than 80%.

In particular, this invention provides a method for preparation of small particle sized polybutadiene latex for ABS production. Before the conversion reaches 40%, the reaction temperature is controlled in the range of 63~69° C.; when the conversion is in the range of 40% ~80%, the reaction temperature is controlled in the range of 60~66° C.; when the conversion is more than 80%, the reaction temperature is controlled in the range of 70~75° C.

In this invention, the polymerization reaction speed is increased in the initial phase so that more heat is released. When the conversion is in the range of 40% ~80%, the temperature is reduced to slower the heat-releasing speed in the middle phase. When the conversion is more than 80%, the reaction temperature is increased to the highest to accelerate the reaction. Thus, stable controlling of heat-releasing in PB polymerization is achieved while the reaction time is shortened.

In this invention, the reaction temperature is controlled or determined according to the conversion, resulting in very good effects which are:

1. When the conversion is in the range of 40~80%, temperature difference between the reactor and the jacket is 30° C. as the reaction temperature is not reduced, and the temperature difference between the reactor and the jacket is 20° C. as the reaction temperature is reduced.

2. After reducing the reaction temperature when the conversion is in the range of 40~80%, the latex performance is apparently better than that obtained from ladder-type temperature-improving method:

1) Reduced viscosity: without this method, the viscosity is 187 cps, while the viscosity is 92 cps with this method;

2) Reduced gel: without this method, the gel is 88%, while the gel is 85% with this method;

Other properties are same with those methods in which the temperature is not reduced. The performance of PB latex are not adversely affected.

3. PB polymerization is achieved in relatively moderate conditions: Before the conversion reaches 40%, the temperature difference between the reactor and the jacket is controlled in the range of 5~15° C.; when the conversion is in the range of 40~80%, the temperature difference between the reactor and the jacket is controlled in the range of 18~25° C.

4. The requirements on refrigerating agent are reduced, and common circulating water can be used to remove the reaction heat.

These and other features, aspects and advantages of the present invention will become better understood with reference to the following description and appended claims.

DESCRIPTION OF DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE INVENTION

Figure 1:
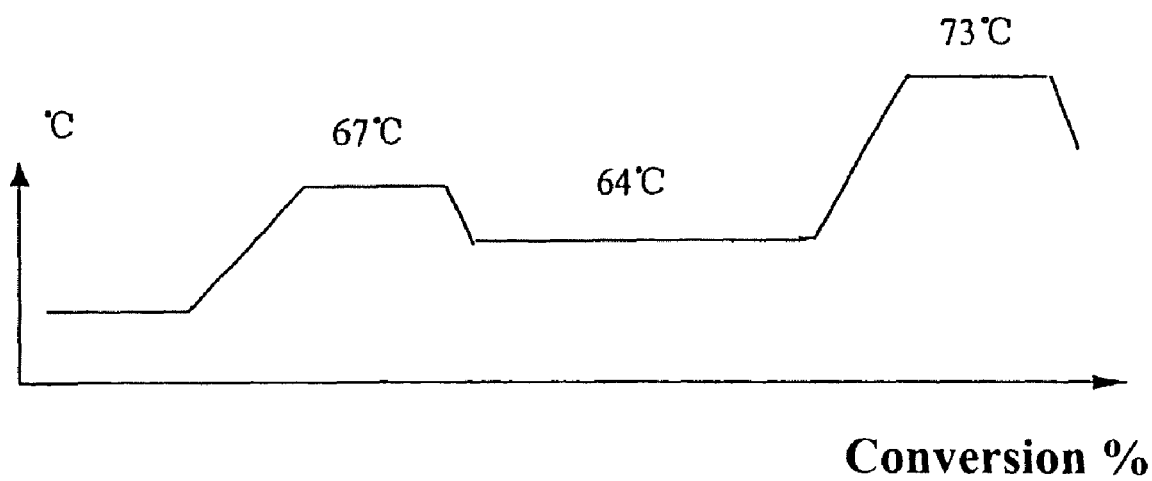
FIG. 1 is a temperature-controlling curve of polymerization reaction in example 9.

Reference will now be made in detail to embodiments of the present invention. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Example 1

Polymerization is conducted with the following ingredients, parts by weight, and operating conditions:

1) Ingredients and parts by weight (such as kilogram) are as follows:

| | |
|---|---|
| Butadiene | 142.5 |
| Styrene | 7.5 |
| Emulsifying agent | 42.75 |
| Tert-dodecylthiol | 0.675 |
| Electrolyte ($K_2C_O3$) | 0.69 |
| $K_2S_2O_8$ (3%) | 15 |
| Water | 217.5 |

2) Operating Conditions and Steps:

Potassium oleate (10%) and potassium abietate (12%) were mixed in a proportion of 24:18.75 to make the emulsifying agent. The above said ingredients were all added into the reactor except the emulsifying agent. 88% of the emulsifying agent was added at the same time. The reaction temperature was controlled at 67° C. When the conversion reached 30%, the remaining 12% of the emulsifying agent were added. The polymerization was completed in ten hours.

3) Results:

| | |
|---|---|
| Reaction time | 10 hours |
| Particle size of Latex | 103 nm |
| Latex viscosity | 72 cps |
| Monomer conversion | 99.5% |

Example 2

The same amount of the ingredients in the same process of example 1 is applied, except that styrene was removed or it was free of styrene.
Results:

| | |
|---|---|
| Reaction time | 7 hours |
| Particle size of Latex | 120 nm |
| Latex viscosity | 172 cps |
| Monomer conversion | 99.5% |

Example 3

The following ingredients and parts by weight (such as kilogram) were used:

| | |
|---|---|
| Butadiene | 142.5 |
| Styrene | 7.5 |
| Emulsifying agent | 41.25 |
| Tert-dodecylthiol | 0.675 |
| Electrolyte (($K_2C_o3$)) | 0.69 |
| $K_2S_2O_8$ (3%) | 15 |
| Water | 217.5 |

The same process of example 1 was carried out, except that the ratio of potassium oleate (10%) and potassium abietate (12%) in the emulsifying agent was 15:26.25.
Results:

| | |
|---|---|
| Reaction time | 9 hours |
| Particle size of Latex | 85 nm |
| Latex viscosity | 250 cps |
| Monomer conversion | 100% |

Comparative Example 1

The same ingredients and process of example 1 were applied, except that fatty acid potassium was used to replace same amount of potassium oleate in example 1.
Results:

| | |
|---|---|
| Reaction time | 11 hours |
| Particle size of Latex | 101.3 nm nm |
| Latex viscosity | 346 cps |
| Monomer conversion | 97% |

Example 4

The same ingredients and process of example 1 were applied, except that the amount of Electrolyte was increased to 0.75.
Results:

| | |
|---|---|
| Reaction time | 11 hours |
| Particle size of Latex | 115 nm |
| Latex viscosity | 72 cps |
| Monomer conversion | 99.5% |

Example 5

The same ingredients and process of example 1 were applied, except that the reaction temperature was controlled at 64° C.
Results:

| | |
|---|---|
| Reaction time | 18 hours |
| Particle size of Latex | 110 nm |
| Latex viscosity | 260 cps |
| Monomer conversion | 93% |

Example 6

The same ingredients and process of example 1 were applied, except that the reaction temperature was controlled at 69° C.
Results:

| | |
|---|---|
| Reaction time | 15 hours |
| Particle size of Latex | 103 nm |
| Latex viscosity | 182 cps |
| Monomer conversion | 93% |

Example 7

The same ingredients and process of example 1 were applied, except that the reaction temperature was controlled at 67±0.5° C.
Results:

| | |
|---|---|
| Reaction time | 10 hours and 30 minutes |
| Particle size of Latex | 109 nm |
| Latex viscosity | 93.6 cps |
| Monomer conversion | 99.5% |

Comparative Example 2

The same ingredients and process of example 1 were applied, except that 1.5 parts sodium dodecyl benzene sulfonate were used to replace potassium oleate. The amount of disproportionated potassium abietate was 48 parts. The reaction temperature was 62° C.

Results:

| Reaction time | 14 hours |
|---|---|
| Particle size of Latex | 83 nm |
| Latex viscosity | 350 cps |
| Monomer conversion | 94% |

Example 8

The same ingredients and process of example 1 were applied, except that the added amount of Tert-dodecylthiol (TDM) was reduced to 0.45, and the reaction temperature was controlled at 67±0.5° C.
Results:

| Reaction time | 16 hours |
|---|---|
| Particle size of Latex | 110 nm |
| Latex viscosity | 70 cps |
| Monomer conversion | 95% |

Example 9

The ingredients and process of example 1 were adopted, except that the temperature-controlling curve shown in FIG. 1 was used for controlling reaction temperature through out the process. When the conversion of small particle sized PB latex reached 40%, the reaction temperature of polymerization was controlled at 67° C.

When the conversion was in the range of 40%-80%, the reaction temperature was controlled at 64° C.; when the conversion was more than 80%, the reaction temperature was controlled at 73° C. As a result, the max temperature difference between the reactor and the jacket was 27° C.; the latex gel was 85%; the latex viscosity was 72 cps.

Comparative Example 3

The same ingredients and process of example 1 were applied while reaction temperature throughout the process was controlled stably at 67° C. The result of the polymerization reaction showed that during the time when conversion was in the range of 40%-80%, the temperature difference between the reactor and the jacket was 57° C.; the latex gel was 89.4%; the latex viscosity was 184 cps.

Example 10

Polymerization was carried out according to temperature-controlling curve of method of example 9, wherein before the conversion reached 40%, the reaction temperature was controlled at 66° C.; when the conversion was in the range of 40%-80%, the reaction temperature was controlled at 64° C.; when the conversion was more than 80%, the reaction temperature was controlled at 73° C. The results were that the temperature difference between the reactor and the jacket was 25° C.; the latex gel was 84%; the latex viscosity was 116 cps.

Comparative Example 4

The same ingredients and process of example 1 were applied while reaction temperature throughout the process was controlled stably at 66° C. The results showed that during the time when the conversion was in the range of 40%-80%, the temperature difference between the reactor and the jacket was 41° C.; the latex gel was 87%; the latex viscosity was 120 cps.

It will be appreciated by those skilled in the art that various modifications and variations can be made in the present invention without departing from the scope of the invention. It is intended that the present invention include such modifications and variations as come within the scope of the appended claims and their equivalents.

What is claimed is:

1. A method for preparation of small particle sized polybutadiene latex for ABS, comprising the steps of:
providing the following weight percent of ingredients:

| butadiene | 34.00~45.00%, |
|---|---|
| a second monomer | 0~6.0%, |
| desalinized water | 52.11~63.13%, |
| tert-dodecylthiol (TDM) | 0.12~0.22%, |
| emulsifying agent | 0.80~2.60%, |
| electrolyte | 0.12~0.32%, |
| $K_2S_2O_8$ | 0.06~0.20%, | adding the ingredients, including an amount in the range of about 80% to 90% of the 0.80 -2.60% by weight percent of the emulsifying agent, into a polymerization reactor;
stirring and heating for polymerization;
controlling the temperature for polybutadiene polymerization within a range of from about 60° C. to 75° C.;
allowing for a reaction time in a range of about 9 to 12 hours; and
adding the remainder of the emulsifying agent when the conversion reaches a range of about 60% to 80%;
wherein the emulsifying agent is prepared by mixing about 1 part potassium oleate to about 0.2 to 0.8 parts potassium abietate; and
wherein the second monomer is selected from the group consisting of styrene, acrylonitrile, and methyl methacrylate.

2. The method for preparation of small particle-sized polybutadiene latex according to claim 1, wherein the second monomer is styrene.

3. The method for preparation of small particle-sized polybutadiene latex according to claim 2, wherein the added amount of the second monomer styrene in said providing step is between about 1.2 to 3.5% by weight.

4. The method for preparation of small particle-sized polybutadiene latex according to claim 1, wherein the reaction temperature of polymerization is controlled in the range of about 63° C. to 69° C. before the conversion reaches 40%.

5. The method for preparation of small particle-sized polybutadiene latex according to claim 4, wherein the reaction temperature of polymerization is controlled in the range of about 60 to 66° C. when the conversion is in the range of about 40% to about 80%.

6. The method for preparation of small particle-sized polybutadiene latex according to claim 5, wherein the reaction temperature of polymerization is controlled in the range of about 70-75° C. when the conversion is more than 80%.

* * * * *